United States Patent [19]
Karl

[11] Patent Number: 6,073,453
[45] Date of Patent: Jun. 13, 2000

[54] METHOD AND DEVICE FOR DETECTING THE PRESENCE OF LIQUID AT THE SUCTION INLET OF A COMPRESSOR OF REFRIGERATING FLUID

[75] Inventor: Stefan Karl, Paris, France

[73] Assignee: Valeo Climatisation, La Verriere, France

[21] Appl. No.: 09/113,041

[22] Filed: Jul. 9, 1998

[30] Foreign Application Priority Data

Jul. 9, 1997 [FR] France ............................... 97 08735

[51] Int. Cl.[7] ....................................... F25B 49/02
[52] U.S. Cl. ............................ 62/83; 62/126; 62/129
[58] Field of Search ..................... 62/125, 126, 127, 62/129, 83, 228.1, 228.3, 208, 209

[56] References Cited

U.S. PATENT DOCUMENTS

| | | | |
|---|---|---|---|
| 3,913,347 | 10/1975 | Stevens | 62/83 X |
| 4,686,834 | 8/1987 | Haley et al. | 62/209 |
| 5,230,223 | 7/1993 | Hullar et al. | 62/126 X |
| 5,560,213 | 10/1996 | Wieszt | 62/129 X |
| 5,586,445 | 12/1996 | Bessler | 62/126 |
| 5,737,930 | 4/1998 | Karl | 62/117 |
| 5,746,062 | 5/1998 | Beaverson et al. | 62/129 X |

FOREIGN PATENT DOCUMENTS

| | | |
|---|---|---|
| 2 717 126 | 9/1995 | France . |
| 2 731 952 | 9/1996 | France . |

*Primary Examiner*—Harry B. Tanner
*Attorney, Agent, or Firm*—Morgan & Finnegan, LLP

[57] ABSTRACT

The pressure of the fluid at the outlet of the compressor is measured by a pressure sensor connected to a control module. When the fluid circulates in a heating loop not comprising a condenser, so as to heat a flow of air by heat exchange in the evaporator, and pressure oscillations indicating the presence of liquid are detected, the momentary opening of a discharge valve is triggered to send a portion of the fluid into the condenser of the air conditioning loop. The presence of liquid is thus detected and eliminated without having recourse to special sensors.

17 Claims, 1 Drawing Sheet

METHOD AND DEVICE FOR DETECTING THE PRESENCE OF LIQUID AT THE SUCTION INLET OF A COMPRESSOR OF REFRIGERATING FLUID

BACKGROUND OF THE INVENTION

1. Technical Field of the Invention

The invention relates to a method for detecting the presence of liquid in a compressor used to circulate a fluid which may be present in the liquid state or the gaseous state.

2. Description of the Background Art

Under certain circumstances droplets of liquid may be present at the suction inlet of a compressor such as a compressor used in particular to circulate a refrigerating fluid in a circuit of an air conditioning device for the passenger compartment of an automobile vehicle. The said droplets cause a malfunctioning of the compressor and also premature wear of the components of the circuit and decrease the thermal efficiency.

Such an effect may be detected in particular in a circuit such as those described in FR-A-2 717 126 and FR-A-2 731 952, comprising a first branch containing an evaporator followed by the said compressor, a second branch containing a condenser and a third branch not containing a condenser, the second and third branches being positioned parallel to one another so as to form, a cooling loop and a heating loop with the first branch, respectively, switching means being provided to send the fluid emerging from the first branch either into the second branch or into the third branch, and the device also comprising means to send into the passenger compartment air which has been subjected to a heat exchange with the evaporator.

When the fluid circulates in the heating loop, the evaporator is used as a heat exchanger for heating the passenger compartment. In the said loop the fluid normally remains in the gaseous state, but liquid droplets may form by condensation in the evaporator, in particular at low temperatures.

The object of the invention is to detect the presence of liquid at the suction inlet of the compressor without calling upon special sensors which would add greatly to the cost of the circuit.

The invention is based on the discovery that the said presence of liquid causes oscillations in the delivery pressure of the compressor, and these oscillations may be distinguished by their amplitude and their frequency from variations due to other causes.

SUMMARY OF THE INVENTION

In the method in accordance with the invention, the pressure of the fluid at the outlet of the compressor is measured continuously and the amplitude of the oscillations of the said pressure is evaluated, an amplitude greater than a predetermined threshold indicating the presence of liquid.

Optional, complementary or alternative, characteristic features of the invention are listed below:

The said threshold is approximately 1 bar from peak to peak.

An electrical signal representing the said pressure is filtered and the amplitude of the filtered signal is evaluated in such a manner as to take into account only oscillations having a frequency within a predetermined domain.

The said domain comprises the range between 0.1 and approximately 1 Hz.

The oscillations having an amplitude greater than the said threshold are counted, the presence of liquid being indicated by a predetermined number of oscillations being reached during a pre-set period, The said number and the said period are respectively 5 and approximately 1 minute.

Measurement or the processing of the pressure is interrupted during a predetermined period after any action of a nature to cause perturbations in the pressure of the fluid.

The fluid is a refrigerating fluid circulating in the circuit of an air conditioning device for the passenger compartment of an automobile vehicle, the said circuit comprising a first branch containing an evaporator followed by the said compressor, a second branch containing a condenser and a third branch not containing a condenser, the second and third branches being positioned parallel to one another so as to form with the first branch a cooling loop and a heating loop, respectively, switching means being provided to send the fluid emerging from the first branch either into the second branch or into the third branch, and the device also comprising means to send into the passenger compartment air which has been subjected to a heat exchange with the evaporator, and in that when the presence of liquid is detected at the suction inlet of the compressor during circulation of the fluid in the heating loop, a quantity of fluid is transferred from the latter into the second branch.

A quantity of fluid is transferred from the heating loop into the second branch by opening, for a predetermined period, a discharge valve forming a connection between them.

The discharge valve allows a smaller flow of fluid, at an equal pressure, than the flow normally circulating in the heating loop.

Another object of the invention is a device for employing the method described above, comprising a pressure sensor located at the output of the compressor and means appropriate for treating a signal produced by the sensor so as to detect the presence of liquid in the compressor by comparison of the amplitude of the oscillations of the said signal with a predetermined threshold.

In the case of a refrigerating fluid circuit comprising a heating loop, the device also comprises means controlled by the processing means, namely a discharge valve for transferring a quantity of fluid from the heating loop into the second branch.

DETAILED DESCRIPTION OF A PREFERRED EMBODIMENT

Figure 1:
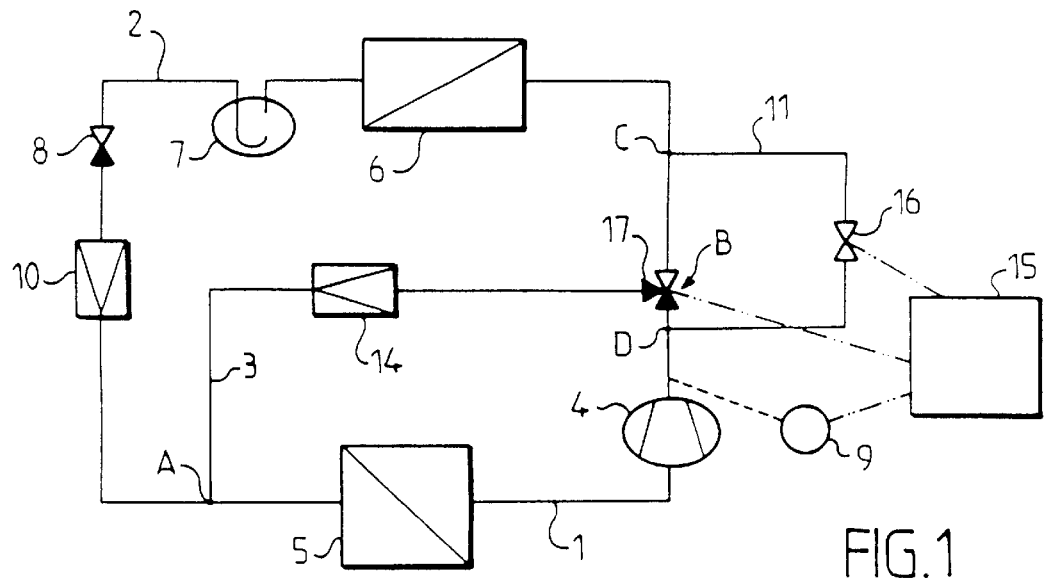
FIG. 1 is a diagram of a refrigerating fluid circuit used for the air conditioning and heating of the passenger compartment of a vehicle equipped with a device in accordance with the invention.

In the circuit shown in FIG. 1, a fluid circulates which is able to pass from the liquid state to the gaseous state by absorbing heat and from the gaseous state to the liquid state by releasing heat, as is the customary case in vehicle air conditioning installations. The components of the said circuit are also normally encountered in such air conditioning installations.

The components of the circuit shown are distributed in three branches 1, 2 and 3 connected together at junction points A and B. Branch 1 contains a compressor 4 which makes the fluid circulate from point A to point B, and an evaporator 5 located upstream from the compressor. Branch 2 contains, going from point B to point A, a condenser 6, a tank 7, an anti-return valve 8 and a pressure reducer 10. Another pressure reducer 14 is located in branch 3. A pressure sensor 9 detects the pressure of the fluid at the output of the compressor. The three paths of a three-way valve 17 situated at point B communicate respectively with the branches 1, 2 and 3. A by-pass 11 containing a discharge valve 16, connects a point D situated downstream from the compressor in branch 1 to a point C situated in the branch 2 between the valve 17 and the condenser 6 in such a manner that the valve 16 connects the said two branches in parallel with the valve 17. The valve 17 is controlled by a control module 15 so as to connect the downstream end of the branch 1 to either the upstream end of branch 2, or that of branch 3.

During operation of the device in cooling mode, the fluid delivered by the compressor 4 passes through the point B, the valve 17 and the point C to reach the condenser 6, where it condenses releasing heat to the ambient air, then passes through the tank 7 and the anti-return valve 8 and undergoes a pressure reduction in the thermostatic pressure reducer 10. The fluid evaporates in the evaporator 57 cooling the air intended to be sent into the passenger compartment of the vehicle. The gaseous fluid emerging from the evaporator 5 is again sucked in by the compressor.

In the heating mode, the fluid circulates in the heating loop formed by the branches 1 and 3. On emerging from the compressor 4 it passes through the point D and the valve 17 then into the pressure reducer 14 and, whilst remaining in the gaseous state, arrives at the evaporator 5 where it releases heat to the air intended to be sent into the passenger compartment. The fluid then returns to the compressor.

According to the invention, the pressure sensor 9, which is connected to the control module 15 and also serves to control the fluid circulation in the cooling mode, is used to detect the presence of liquid in the heating mode, this presence being able to result from condensation in the evaporator 5.

Figure 2:
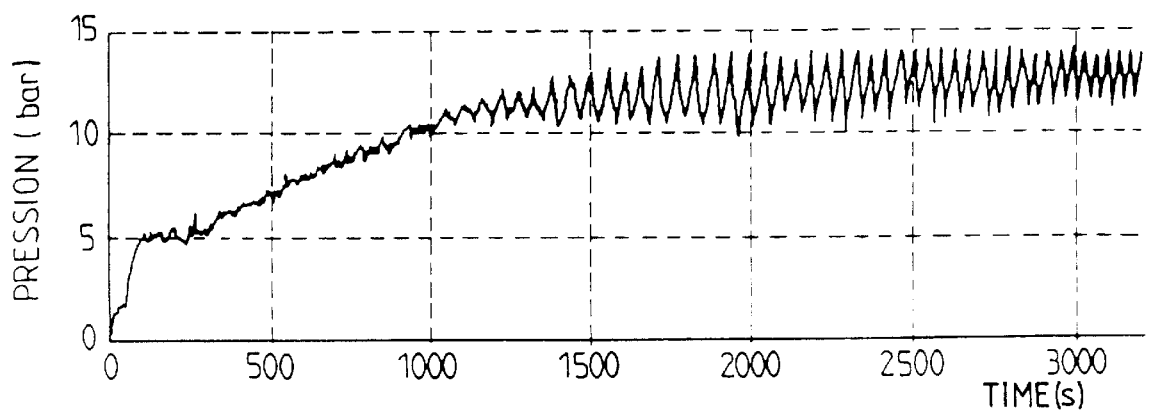
FIGS. 2 and 3 are diagrams showing the variations with time of the signal supplied by the pressure sensor, before and after filtering.

The curve in FIG. 2 shows an example of the variation with time of the pressure measured by the sensor 9 at the outlet of the compressor, beginning with a cold start of the heat engine of the vehicle and the fluid circulating in the heating loop to ensure additional heating. After a relatively regular initial rising phase, oscillations appear due to the formation of droplets of liquid by condensation in the evaporator 5. The signal supplied by the sensor 9 is filtered in the control module 15 in the pass-band from 0.1 to 1 Hz, and the filtered signal thus obtained is shown in FIG. 3.

Figure 3:
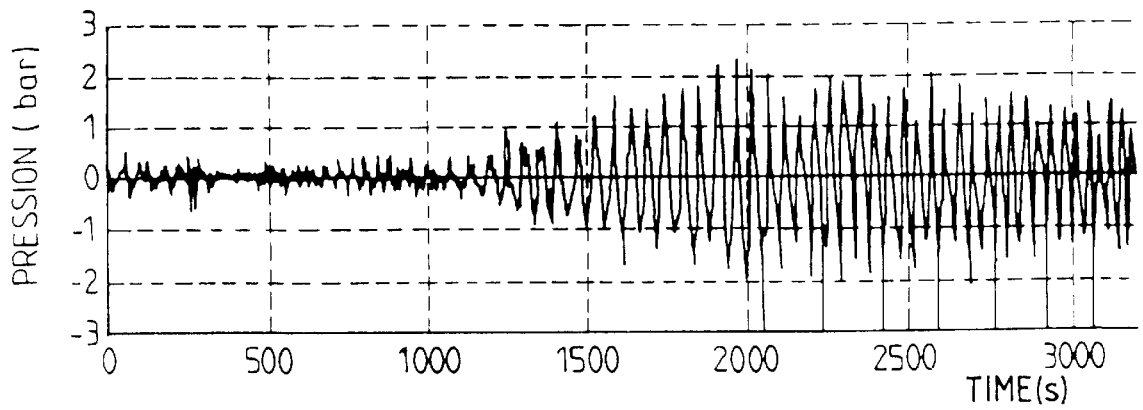

Also according to the invention, the signal shown in FIG. 3 is used to open momentarily the discharge valve 16, which is normally closed in the heating mode. By way of example, the oscillations that have a peak to peak amplitude greater than 1 bar are counted and a 30 to 3000 ms pulse for opening the valve is triggered when the number of oscillations reaches at least 3 during a period of 1 minute. Preferably no account is taken of pressure variations occurring during a predetermined period after an action of a nature which would cause such variations independently of the presence of liquid, for example the starting of the compressor or a modification of the configuration of the circuit.

Preferably the flow allowed by the discharge valve 16 is small in relation to that allowed by the valve 17 to the branch 3, so that the operation of the heating loop is not disturbed by the discharge of fluid. It is however possible, as an alternative, to eliminate the by-pass 11 and the discharge valve 16 and to use the valve 17 for the discharge of fluid.

Use of the method according to the invention is not limited to the circuit shown in FIG. 1. The method may be used to trigger, in response to the detection of the presence of liquid, any suitable action to resorb the said liquid, in particular by decreasing the amount of fluid circulating in the compressor or its pressure, and more particularly by reducing the operating speed or volumetric capacity of the compressor.

What is claimed is:

1. A method for detecting a presence of liquid at a suction inlet of a compressor used to circulate a fluid which may be present in a liquid state or a gaseous state, comprising:
   continuously measuring a pressure of the fluid at an outlet of the compressor and evaluating an amplitude of oscillations of the pressure,
   wherein the amplitude greater than a predetermined threshold indicates the presence of liquid.

2. The method in accordance with claim 1, wherein said predetermined threshold is approximately 1 bar from peak to peak.

3. The method in accordance with claim 1, wherein an electrical signal representing the pressure is filtered and the amplitude of the filtered signal is evaluated to take into account only oscillations having a frequency within a predetermined domain.

4. The method in accordance with claim 3, wherein said predetermined domain comprises a range between 0.1 and approximately 1 Hz.

5. The method in accordance with claim 1, wherein the oscillations having an amplitude greater than said predetermined threshold are counted, the presence of liquid being indicated by a predetermined number of oscillations being reached during a pre-set period.

6. The method in accordance with claim 5, wherein said predetermined number is 5 and said pre-set period is approximately 1 minute.

7. The method in accordance with claim 1, wherein measurement or processing of the pressure is interrupted during a predetermined period after any action of a nature to cause perturbations in the pressure of the fluid.

8. The method in accordance with claim 1, wherein the fluid is a refrigerating fluid circulating in a circuit of an air conditioning device for a passenger compartment of an automobile vehicle, said circuit comprising a first branch containing an evaporator followed by the compressor, a second branch containing a condenser and a third branch not containing a condenser, the second and third branches being positioned parallel to each other so as to form with the first branch a cooling loop and a heating loop, respectively, switching means being provided to send the fluid emerging from the first branch either into the second branch or into the third branch, the air conditioning device further comprising means for sending into the passenger compartment air which has been subjected to a heat exchange with the evaporator, a quantity of fluid being transferred from the heating loop into the second branch when the presence of liquid is detected at the suction inlet of the compressor during circulation of the fluid in the heating loop.

9. The method in accordance with claim 8, wherein the quantity of fluid is transferred from the heating loop into the second branch by opening, for a predetermined period, a discharge valve forming a connection between the heating loop and the second branch.

10. The method in accordance with claim 9, wherein the discharge valve allows a smaller flow of fluid, at an equal pressure, than the flow normally circulating in the heating loop.

11. A device for detecting the presence of liquid at a suction inlet of a compressor, comprising:

pressure sensor located at an output of the compressor; and means for treating a signal produced by the pressure sensor so as to detect the presence of liquid in the compressor by comparison of the amplitude of the oscillations of said signal with said predetermined threshold.

12. A device for detecting a presence of liquid at a suction inlet of a compressor, comprising:

pressure sensor for measuring pressure at the compressor; and control module for evaluating an amplitude of oscillations of the pressure measured by the pressure sensor, wherein the amplitude greater than a predetermined threshold indicates the presence of liquid.

13. The device in accordance with claim 12, wherein the pressure sensor generates a signal representing a measurement of the pressure, the control module including a filter for filtering oscillations of the signal having a frequency within a predetermined domain.

14. An air conditioning device comprising:

a fluid circuit having a heating loop and a cooling loop;

a compressor for circulating fluid in the fluid circuit;

pressure sensor for measuring pressure at the compressor; and control module for evaluating an amplitude of oscillations of the pressure measured by the pressure sensor, wherein the amplitude greater than a predetermined threshold indicates the presence of liquid.

15. The air conditioning device in accordance with claim 14, wherein the fluid circuit includes a first branch, a second branch and a third branch, the first branch having an evaporator followed by the compressor, the second branch having a condenser and the third branch not having a condenser, the second and third branches being positioned parallel to each other so as to form with the first branch the cooling loop and the heating loop, respectively, the air conditioning device further comprising:

switching means for sending the fluid emerging from the first branch into one of the second branch and into the third branch, and means for sending into a passenger compartment air subjected to a heat exchange with the evaporator, wherein said control module causes said switching means to transfer a quantity of fluid from the heating loop into the second branch when the presence of liquid is detected at the suction inlet of the compressor during circulation of the fluid in the heating loop.

16. The device in accordance with claim 14, further comprising a discharge valve for transferring a quantity of fluid from the heating loop into the cooling loop.

17. A device for detecting a presence of liquid at a suction inlet of a compressor, comprising:

means for measuring pressure at the compressor; and means for evaluating an amplitude of oscillations of the pressure measured by said means for measuring, wherein the amplitude greater than a predetermined threshold indicates the presence of liquid.

* * * * *